Nov. 3, 1970     D. P. BROWN ET AL     3,538,434
    METHOD FOR DETECTING ONE OF HEAVY WATER AND ORDINARY
          WATER IN THE PRESENCE OF THE OTHER OF
              HEAVY WATER AND ORDINARY WATER
Filed June 9, 1967                    2 Sheets-Sheet 1
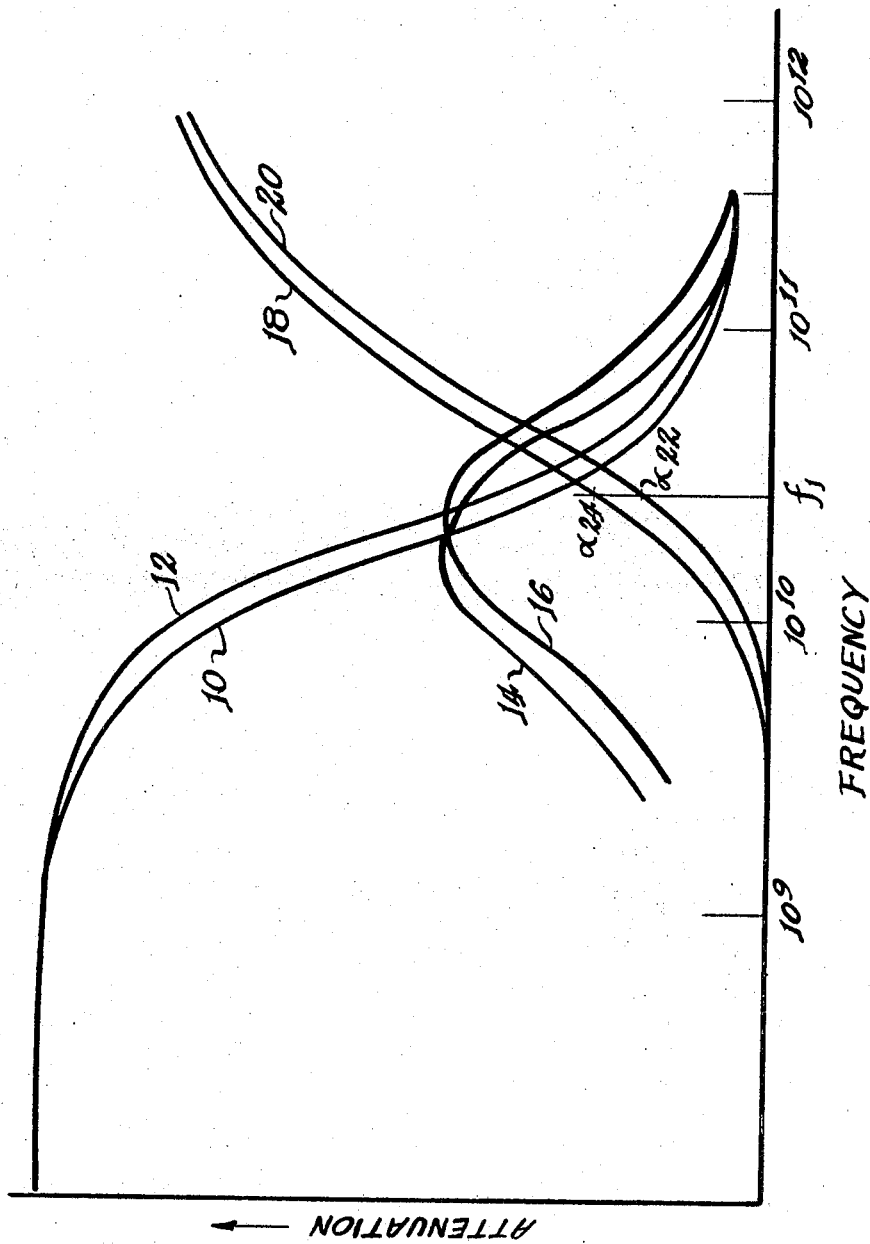
Inventors
Donald P. Brown
George F. Garlick
Newell S. Porter
Attorney

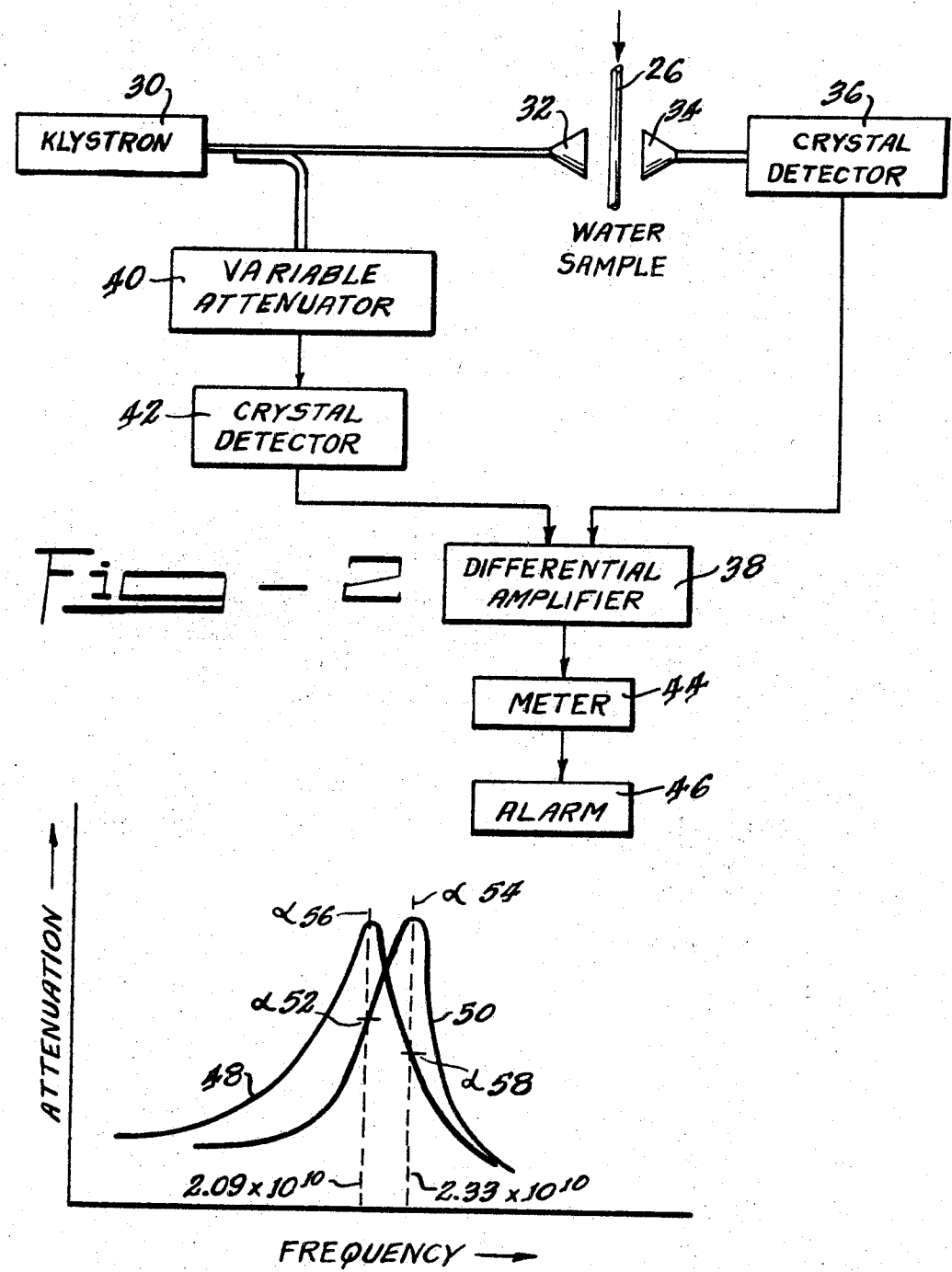

United States Patent Office 3,538,434
Patented Nov. 3, 1970

3,538,434
METHOD FOR DETECTING ONE OF HEAVY WATER AND ORDINARY WATER IN THE PRESENCE OF THE OTHER OF HEAVY WATER AND ORDINARY WATER
Donald P. Brown, Richland, George F. Garlick, Kennewick, and Newell S. Porter, Richland, Wash., assignors to the United States of America as represented by the United States Atomic Energy Commission
Filed June 9, 1967, Ser. No. 645,580
Int. Cl. G01r 27/04
U.S. Cl. 324—58.5       5 Claims

ABSTRACT OF THE DISCLOSURE

A method for detecting one of heavy water and ordinary water in the presence of the other of heavy water and ordinary water wherein a microwave signal generated at a frequency responsive to the differential polarization-attenuation characteristics of the heavy water and ordinary water is transmitted through the said other of heavy water and ordinary water and then detected. The generated microwave signal is also attenuated and the amplitudes of the attenuated microwave signal and transmitted detected microwave signal are compared.

CONTRACTUAL ORIGIN OF THE INVENTION

The invention described herein was made in the course of, or under, a contract with the United States Atomic Energy Commission.

BACKGROUND OF THE INVENTION

The present invention relates to techniques for detecting the presence of heavy water and more particularly to a method for detecting the presence of heavy water in ordinary water.

Heavy water ($D_2O$) is used in nuclear reactors as a moderator and/or coolant. Ordinary water ($H_2O$) is used in secondary coolant loops as a heat exchanger for the moderating and/or cooling of heavy water. Leakage of the heavy water from the moderating and/or cooling system into the ordinary water presents possible radioactive contaminant problems. Further, heavy water is expensive and leakage can constitute an appreciable financial loss. Thus, it is desirable to detect accurately, simply and reliably any leakage of heavy water into ordinary water. Scintillation techniques have been attempted. However, they have to date proved inadequate and present techniques involve taking samples of ordinary water and subjecting them to rigorous and time-consuming laboratory analysis. The laboratory analysis technique is totally inadequate for present practice since, while such analysis is being completed, the loss of heavy water continues with its attendant undesirable features, should a leak actually exist.

SUMMARY OF THE INVENTION

It is therefore one object of the present invention to provide a method for detecting one of heavy water and ordinary water in the presence of the other of heavy water and ordinary water.

It is another object of the present invention to provide a method for detecting automatically, simply, reliabily and quickly the presence of heavy water in ordinary water.

It is another object of the present invention to provide a method for continuously monitoring heavy water to detect the presence therein of ordinary water.

Other objects of the present invention will become more apparent as the detailed description proceeds.

In general, the method of the present invention comprises generating a microwave signal at a frequency responsive to the differential polarization-attenuation characteristics of heavy water and ordinary water thereto and transmitting the microwave signal through the heavy water or ordinary water medium being monitored. The transmitted microwave signal, after passing through the ordinary water or heavy water being monitored, is detected. The generated microwave signal is also passed through an attenuator where it is attenuated a predetermined amount. The attenuated microwave signal and detected microwave signal are then compared to give a measure of the presence of heavy water or ordinary water in the water medium being monitored.

BRIEF DESCRIPTION OF THE DRAWINGS

Further understanding of the present invention may best be obtained by consideration of the accompanying drawings wherein:

FIG. 1 is a graphical illustration of the relative dielectric constant $\epsilon'$, the relative loss factor $\epsilon''$, and the attenuation $\alpha$ of ordinary water and heavy water as a function of frequency.

FIG. 2 is an apparatus for the practice of the present invention.

FIG. 3 is a graphical illustration of the attenuation $\alpha$ as a function of frequency for vaporized heavy water and ordinary water.

In the method of the present invention, a microwave signal is generated at a frequency $f_1$. This signal is then transmitted through the ordinary water or heavy water medium being monitored and is detected after transmission therethrough. The generated microwave signal is also fed to an attenuator where it is attenuated. The amplitudes of the detected microwave signal after transmission through the ordinary water or heavy water being monitored and the attenuated microwave signal are then compared to give a measure of the presence of heavy water or ordinary water in the ordinary water or heavy water, respectively, being monitored.

Further understanding of the method according to the present invention may be obtained by consideration of the theory thereof.

The propagation constant of microwave signals through a medium is expressed as $$\gamma = \alpha + j\beta \tag{1}$$

where $\gamma$ is the propagation constant of the microwave signal through the medium, $\alpha$ is the attenuation constant due to the medium and $\beta$ is the phase shift constant due to the medium. Further the propagation constant $\gamma$ may also be expressed by the formula $$\gamma = -j\omega\sqrt{\mu\epsilon_c} \tag{2}$$

where $\omega$ is the angular frequency of the microwave signal, $\mu$ is the permeability constant of the medium and $\epsilon_c$ is the complex dielectric constant of the medium. The complex dielectric constant of the medium $\epsilon_c$ may be expressed as $$\epsilon_c = \epsilon_0(\epsilon' - j\epsilon'') \tag{3}$$

where $\epsilon_0$ is the dielectric constant of free space, $\epsilon'$ is the relative dielectric constant of the medium and $\epsilon''$ (the relative loss factor) is a term relating to the dielectric conductivity of the medium $\sigma = \omega\epsilon''$. The attenuation of a microwave signal passing through a medium having a complex relative dielectric constant $\epsilon' - j\epsilon''$ is given by $$\alpha = \frac{\omega}{c}\left(\frac{1}{2}\sqrt{\epsilon'^2 + \epsilon''^2} - \epsilon'\right)^{1/2} \tag{4}$$

where $\alpha$ is the attenuation in nepers/cm., $\omega$ is the microwave signal frequency in radians and $c$ is the velocity of light in a vacuum in cm./sec. From Equation 4 it thus becomes apparent that the attenuation of a microwave signal transmitted through a medium is a function of the dielectric constant of the medium.

The relative dielectric constant $\epsilon'$ may further be expressed as a function of the polarizability of the medium $$\epsilon' = \frac{4\pi \sum_i N_i a_i}{1 - \frac{4\pi}{3} \sum_i N_i a_i} \quad (5)$$

where $a_i$ is defined as the polarizability of the medium at the $i$th lattice site or $i$th molecule in the case of a liquid medium and $N_i$ is the number of atoms per unit volume of the liquid medium.

The frequency dependence of the polarizability of a dipolar liquid is shown in the following expressions for the complex relative dielectric constant $$\epsilon' = \frac{\epsilon_s - \epsilon_\infty}{1 + \omega^2 \tau^2} + \epsilon_\infty \quad (6)$$

$$\epsilon'' = \frac{(\epsilon_s - \epsilon_\infty) \omega \tau}{1 + \omega^2 \tau^2} \quad (7)$$

where $\epsilon_s$ is the static relative dielectric constant, $\epsilon_\infty$ is the relative dielectric constant for $\omega\tau \gg 1$ and $\tau$ is the relaxation time.

Polarizability of the medium is the ratio of the resulting dipole moment to the local electric field and is comprised of several component parts, namely the dipolar, the ionic and the electronic. Where the medium is ordinary water or other liquids, the ionic component of polarizability does not apply and the electronic component is essentially constant for frequencies below the optically visible region.

The dipolar component of polarizability results from the alignment of the permanent dipole moment associated with the molecule in the case of a liquid. Where the liquid is ordinary water, the two hydrogen atoms are separated by 105 degrees. This separation results in the effective center of the positive charge being separated from the center of the negative charge. The resulting dipole moment can be polarized by changing the orientation of the molecule such that the dipole moment is parallel with the electric field. However, due to the relatively large masses involved and the viscosity of the liquid, this component of polarizability will only be possible at relatively low frequencies, microwave and below. If higher frequencies are used, the molecules for ordinary water will not reverse polarity in the time of one-half cycle. Thus, with high frequencies, the molecules of ordinary water will assume a random orientation and the dipolar component of polarizability therefor is nullified. It has been found that the range of frequencies wherein polarization of water changes as a function of frequency is from $10^{10}$ to $3 \times 10^{11}$ hertz.

Where the medium is heavy water, the increased mass of the deuterium compared to hydrogen and viscosity of the liquid cause polarizability thereof to be effective at even lower frequencies than for ordinary water.

Thus, since the attenuation of a microwave signal transmitted through a water medium (either heavy water or ordinary water) is a function of the dielectric constant of the medium and the dielectric constant of the medium is a function of the polarizability of the medium which, in turn, is a function of the mass and viscosity of the medium, the attenuation of the microwave signal by the medium is a function of the polarizability of the medium. This characteristic enables the method of the present invention, as may be further appreciated by referring to the curves of FIG. 1. Idealized curves for $\epsilon'$, $\epsilon''$ and $\alpha$ as a function of frequency are plotted in FIG. 1 for ordinary water and heavy water. The curves 10 and 12 are plots of $\epsilon'$ as a function of frequency for heavy water and ordinary water, respectively. The curves 14 and 16 are plots of $\epsilon''$ as a function of frequency for heavy water and ordinary water, respectively. The curves 18 and 20 are plots of $\alpha$ as a function of frequency for heavy water and ordinary water, respectively. As stated supra, the shift to the lower frequency values for the heavy water curves is due to the difference in the relaxation time $\tau$ of heavy water as compared to that of ordinary water. The relaxation time $\tau$ is a direct function of the liquid viscosity and is related to the molecular mass of the liquid.

As stated above, the method of the present invention is enabled by the dependency relationship of attenuation to polarizability of the liquid medium being monitored and it is to be noted from FIG. 1 that, in the regions of the curves where the dielectric constant and attenuation are changing as a function of frequency, attenuation measurements may be taken according to the present invention which will yield different values depending upon the relative concentration of heavy water and ordinary water. For the practice of the present invention for the detection of heavy water or ordinary water in the presence of ordinary water or heavy water, respectively, measurements may be taken from the frequency range between $10^{10}$ and $3 \times 10^{11}$ hertz, with the preferred operating frequency being $3 \times 10^{10}$ hertz ($f_1$). Where a microwave signal at a frequency of $3 \times 10^{10}$ hertz is transmitted through ordinary water, measurement will give an attenuation value of the microwave signal of $\alpha_{22}$ for the water medium and the measurement reading will increase towards an $\alpha$ value of $\alpha_{24}$ for increasing concentrations of heavy water in the ordinary water. Conversely, where the medium through which the microwave signal is being transmitted is heavy water, the measurements will read an attenuation of the microwave signal of $\alpha_{24}$ at the frequency $3 \times 10^{10}$ hertz and this value will decrease towards $\alpha_{22}$ with the increasing presence of ordinary water.

Turning now to FIG. 2, an apparatus is illustrated for the practice of the method according to the present invention. The water medium being monitored is passed through a glass section 26 of a sampling loop. A klystron 30 generates a microwave signal at the aforedescribed preferred frequency $f_1$ ($3 \times 10^{10}$ hertz) and transmits it to a microwave horn 32. The microwave horn 32 is mounted on one side of the glass section 26. A microwave receiving horn 34 is mounted on the opposing side of glass section 26. The microwave horns 32 and 34 are aligned so that they transmit and receive, respectively, the microwave signal through the water medium being monitored. A crystal detector 36 detects the transmitted microwave signal received by microwave horn 34. The output of the crystal detector 36 is fed to an input of a differential amplifier 38. The microwave output signal from klystron 30 is also fed to a variable attenuator 40. The output of the variable attenuator 40 is detected by a crystal detector 42 and fed to the other input of the differential amplifier 38.

The differential amplifier 38 compares the amplitudes of the two input signals and transmits responsive to any difference therebetween an output signal to a relay meter 44 and a suitable alarm system 46.

In operation, the variable attenuator 40 is set preferably for a value corresponding to the attenuation $\alpha_{22}$ for the detection of heavy water in ordinary water and for a value $\alpha_{24}$ for the detection of ordinary water in heavy water. As stated, $\alpha_{22}$ and $\alpha_{24}$ are the attenuation characteristics, respectively, for ordinary water and heavy water with a microwave signal transmitted therethrough at a frequency of 30 gigahertz. With these attenuation values, the apparatus of FIG. 2 is initially balanced and the attenuation of the applied microwave signal through the monitored liquid is compared with the fixed value of the variable attenuator 40. Any change in the composition of the monitored liquid will change the attenuation characteristics of the monitored liquid which will unbalance the apparatus readout system and give an output from the differential amplifier 38. Thus, the presence of any heavy water in ordinary water will increase the attenuation of the ordinary water being monitored toward the value of $\alpha_{24}$ and similarly the presence of any ordinary water in heavy water will reduce the attenuation of the monitored heavy water toward the value of $\alpha_{22}$, each condition unbalancing the signals into the differential amplifier 38 to give an output signal therefrom which may be detected.

The aforedescribed method in part relies on and is a function of the viscous properties of the liquids being monitored. To eliminate the effect of the viscous properties of the monitored liquid, the liquids being monitored may be vaporized. The vaporized liquids possess absorption spectra for microwave signals which are not a function of the viscous properties of the liquids and the absorption of these vapors is peaked around dominant resonance absorption lines, as shown in the two dominant peaks of FIG. 3. The curve 48 in FIG. 3 is a plot of $\alpha$ (attenuation) as a function of frequency for heavy water vapor and curve 50 is a plot of $\alpha$ (attenuation) as a function of frequency for ordinary water. The peaks for each of the curves 48 and 50 occur approximately at 20.9 and 23.3 gigahertz, respectively.

Using the appartuas of FIG. 2, the relative concentrations of heavy water in ordinary water and ordinary water in heavy water may be determined. The liquid being monitored is vaporized for its passage through the glass section 26. The microwave signal transmitted through the glass section 26 is generated at a frequency of 20.9 or 23.3 gigahertz and the variable attenuator 40 is set at a value of either $\alpha_{52}$, $\alpha_{54}$, $\alpha_{56}$, or $\alpha_{58}$. $\alpha_{52}$ and $\alpha_{54}$ are the attenuation values for ordinary water vapor with a microwave signal passed therethrough at a frequency of 20.9 and 23.3 gigahertz, respectively. $\alpha_{56}$ and $\alpha_{58}$ are the attenuation values for heavy water vapor with a microwave signal passed therethrough at a frenquency of 20.9 and 23.3 gigahertz, respectively. Preferably, in detecting the presence of heavy water in ordinary water, the variable attenuator 40 is set at a value of $\alpha_{52}$ or $\alpha_{54}$ where the applied microwave signal has a frequency of 20.9 or 23.3 gigahertz, respectively. With these attenuation values, the apparatus of FIG. 2 is initially balanced and the presence of heavy water vapors in the ordinary water vapors increases the attenuation of the monitored medium towards a value $\alpha_{56}$ at an applied microwave frequency of 20.9 gigahertz and decreases the attenuation of the monitored medium towards a value $\alpha_{58}$ at an applied microwave frequency of 23.3 gigahertz. Conversely, for the detection of ordinary water in heavy water, the variable attenuator is preferably set for a value equal to $\alpha_{56}$ and $\alpha_{58}$ for applied microwaves having a frequency of 20.9 and 23.3 gigahertz, respectively. With these attenuation values, the apparatus of FIG. 2 is again initially balanced and the presence of ordinary water vapors in the heavy water vapors decreases the attenuation of the monitored medium to a value approaching $\alpha_{52}$ with an applied microwave frequency of 20.9 gigahertz and increases the attenuation of the monitored medium to a value approaching $\alpha_{54}$ with an applied microwave frequency of 23.3 gigahertz. Thus, the presence of heavy water vapors in the ordinary water vapors or ordinary water vapors in heavy water vapors will change the attenuation characteristics of the monitored medium to unbalance the apparatus of FIG. 2, resulting in an output signal from differential amplifier 38 which may be detected.

Persons skilled in the art will, of course, readily adapt the general teachings of the invention to methods far different than the methods illustrated. Accordingly, the scope of the protection afforded the invention should not be limited to the particular methods illustrated in the drawings and described above, but should be determined only in accordance with the appended claims.

The embodiments of the invention in which an exclusive property or privilege is claimed are defined as follows:

1. A method for detecting one of heavy water and ordinary water in the presence of the other of heavy water and ordinary water in a sample comprising the steps of; generating a microwave signal at a predetermined frequency value selected such that said heavy water and said ordinary water exhibit respectively different polarization-attenuation characteristics for said microwave signal, transmitting a portion of said microwave signal through the sample, detecting the transmitted microwave signal after passage through the sample, attenuating the remaining portion of said microwave signal, and comparing said detected microwave signal and said attenuated microwave signal to indicate the detection of said one of heavy water and ordinary water.

2. The method according to claim 1 wherein said microwave signal is generated at a frequency between 10 and 300 gigahertz.

3. The method according to claim 1 wherein said microwave signal is attenuated by an amount equal to the attenuation by one of said heavy water and ordinary water of a microwave signal at said generated frequency.

4. The method according to claim 1 wherein said heavy water and ordinary water are vaporized and said microwave signal is transmitted therethrough.

5. The method according to claim 4 wherein said microwave signal is generated at a frequency equal to the dominant resonant absorption frequency of one of said heavy water vapor and ordinary water vapor to an applied microwave signal, and said microwave signal is attenuated by an amount equal to the attenuation by one of said heavy water vapor and ordinary water vapor of a microwave signal at said dominant resonant absorption frequency.

References Cited

UNITED STATES PATENTS

| | | | |
|---|---|---|---|
| 2,867,781 | 1/1959 | Tomiyasu | 324—58.5 |
| 3,079,551 | 2/1963 | Walker. | |
| 3,265,873 | 8/1966 | Sawyer. | |
| 3,265,967 | 8/1966 | Heald. | |

OTHER REFERENCES

Mitchell and Phillips: The Measurement, by Nuclear Resonance, of Light Water Concentration in Mixtures of Light and Heavy Water, British Journal of Applied Physics, 7(2) February 1956, pp. 67–72.

RUDOLPH V. ROLINEC, Primary Examiner

M. J. LYNCH, Assistant Examiner